United States Patent
Takatsuji et al.

(10) Patent No.: US 12,136,882 B2
(45) Date of Patent: Nov. 5, 2024

(54) SWITCHING POWER-SUPPLY UNIT

(71) Applicant: Murata Manufacturing Co., Ltd., Kyoto-fu (JP)

(72) Inventors: Hiroyuki Takatsuji, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 48 days.

(21) Appl. No.: 18/188,227

(22) Filed: Mar. 22, 2023

(65) Prior Publication Data
US 2023/0308022 A1    Sep. 28, 2023

(30) Foreign Application Priority Data

Mar. 25, 2022 (JP) ................. 2022-049349
Jan. 25, 2023 (JP) ................. 2023-009495

(51) Int. Cl.
*H02M 1/44* (2007.01)
*H02M 3/158* (2006.01)
*H02M 3/335* (2006.01)

(52) U.S. Cl.
CPC ......... *H02M 3/33523* (2013.01); *H02M 1/44* (2013.01); *H02M 3/158* (2013.01)

(58) Field of Classification Search
CPC .... H02M 3/33523; H02M 1/44; H02M 3/158; H02M 1/143; H02M 1/008; H02M 1/123; H02M 3/33507; H02M 1/08; H02M 1/0006

USPC .......................................................... 307/9.1
See application file for complete search history.

(56) References Cited

FOREIGN PATENT DOCUMENTS

| JP | 2006271135 A | * | 10/2006 |
| JP | 2015220953 A | * | 12/2015 |
| JP | 2016158316 A | * | 9/2016 |

* cited by examiner

*Primary Examiner* — Elim Ortiz
(74) *Attorney, Agent, or Firm* — Studebaker & Brackett PC (57) ABSTRACT

A switching power-supply unit includes a power conversion circuit, a control circuit, a common-mode choke coil, and half-bridge capacitors. The common-mode choke coil is connected to the control circuit on its side of a direct-current power supply. The half-bridge capacitor is connected to the power conversion circuit on its side of a direct-current power supply, and is connected to the control circuit on its side of the direct-current power supply. A midway point of the half-bridge capacitor is electrically connected to a midway point of the half-bridge capacitor. A noise balancing circuit is configured as a closed circuit including the power conversion circuit, the control circuit, the half-bridge capacitors, and the common-mode choke coil, and causes common-mode currents to be confined and canceled out each other. The common-mode currents are switching noise generated in multiple parts of the closed circuit due to a switching operation of power-conversion switching devices.

16 Claims, 11 Drawing Sheets

SWITCHING POWER-SUPPLY UNIT

CROSS-REFERENCE TO RELATED APPLICATIONS

This application claims benefit of priority to Japanese Patent Application No. 2023-009495, filed Jan. 25, 2023, and to Japanese Patent Application No. 2022-049349, filed Mar. 25, 2022, the entire content of each is incorporated herein by reference.

BACKGROUND

Technical Field

The present disclosure relates to a switching power-supply unit which converts power by using a switching device.

Background Art

Switching power-supply units have a problem of common-mode noise generated by switching devices for control circuits and switching devices for power conversion.

The power supply unit described in Japanese Unexamined Patent Application Publication No. 2006-271135 has a configuration, for reducing occurrence of common-mode noise, in which a power conversion circuit is connected, on its input side and its output side, to common-mode choke coils and half-bridge capacitors. That is, in the power supply unit described in Japanese Unexamined Patent Application Publication No. 2006-271135, both a common-mode choke coil and a half-bridge capacitor are connected between an external direct-current power supply and the power conversion circuit.

However, to suppress common-mode noise, a large-size common-mode choke coil, having high-impedance characteristics, needs to be used.

When a common-mode choke coil having a high impedance is connected to a wiring line connected to a power conversion circuit through which a large current flows, a problem of an increase of heat generation and power loss of the common-mode choke coil arises.

In addition, common-mode noise also occurs from a switching device for a control circuit.

SUMMARY

Accordingly, the present disclosure provides a switching power-supply unit which achieves suppression of heat generation and power loss and which achieves a reduction of occurrence of common-mode noise from a power conversion circuit and a control circuit.

A switching power-supply unit provided by the present disclosure includes a power conversion circuit, a control circuit, a control-circuit-side common-mode choke coil, a first half-bridge capacitor, and a second half-bridge capacitor. The power conversion circuit includes a first input capacitor, a power-conversion switching device, and a first output capacitor, and converts, for output to a load, power supplied from a first direct-current power supply. The control circuit has a direct electrical connection to the power conversion circuit. The control circuit includes a second input capacitor and a switching drive circuit, and generates a drive signal for the power-conversion switching device by using power supplied from a second direct-current power supply.

The control-circuit-side common-mode choke coil is connected to the control circuit on its second direct-current power supply side. The first half-bridge capacitor is connected to the power conversion circuit on its first direct-current power supply side. The second half-bridge capacitor is connected to the control circuit on its second direct-current power supply side. A midway point of the first half-bridge capacitor is electrically connected to a midway point of the second half-bridge capacitor. A noise balancing circuit is formed of a closed circuit including the power conversion circuit, the control circuit, the first half-bridge capacitor, the second half-bridge capacitor, and the control-circuit-side common-mode choke coil. The noise balancing circuit causes common-mode currents to be confined and canceled out each other. The common-mode currents serve as switching noise generated in multiple parts of the closed circuit due to a switching operation of the power-conversion switching device.

In this configuration, the power conversion circuit is connected to the first half-bridge capacitor; the control circuit is connected to the second half-bridge capacitor; the midway point of the first half-bridge capacitor is connected to the midway point of the second half-bridge capacitor. Thus, common-mode currents are confined in the noise balancing circuit including the switching device which serves as a noise source, and are canceled out. The common-mode choke coil is connected to the control circuit whose power is lower than that of the power conversion circuit. Therefore, heat generation and power loss caused by the common-mode choke coil are suppressed.

The present disclosure achieves suppression of heat generation and power loss, and achieves a reduction of occurrence of common-mode noise currents from a power conversion circuit and a control circuit.

DETAILED DESCRIPTION

First Embodiment

Figure 1:
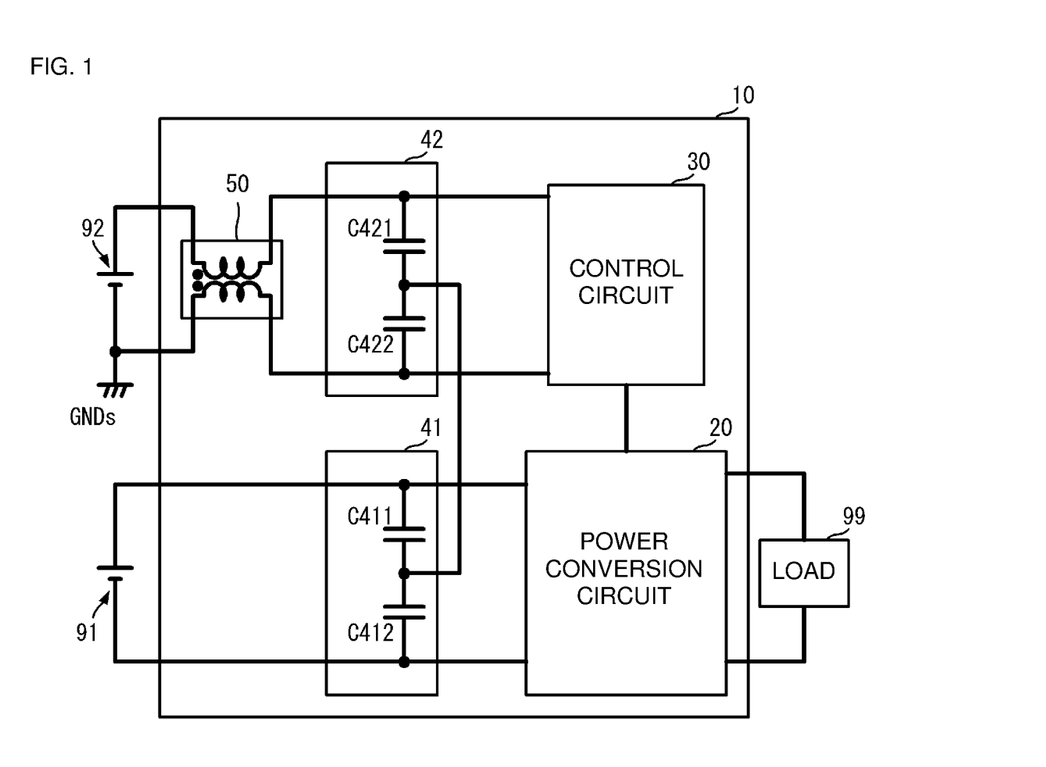
FIG. 1 is a circuit block diagram illustrating a schematic configuration of a switching power-supply unit according to a first embodiment of the present disclosure.
Figure 2:
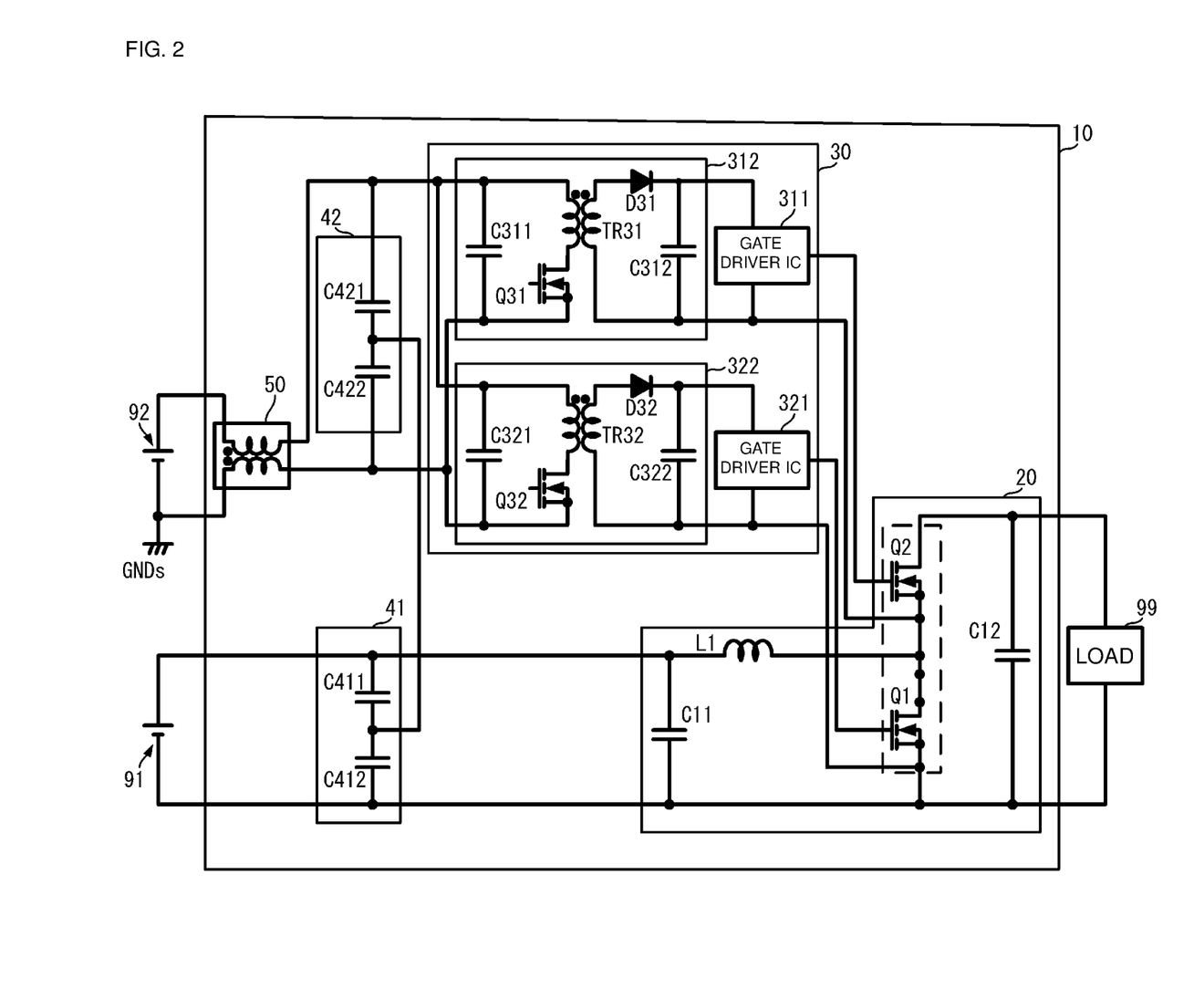
FIG. 2 is a circuit diagram illustrating an exemplary circuit configuration of a switching power-supply unit according to the first embodiment of the present disclosure.

A switching power-supply unit according to a first embodiment of the present disclosure will be described by referring to figures. FIG. 1 is a circuit block diagram illustrating a schematic configuration of the switching power-supply unit according to the first embodiment of the present disclosure. FIG. 2 is a circuit diagram illustrating an exemplary circuit configuration of the switching power-supply unit according to the first embodiment of the present disclosure.

Schematic Configuration and Schematic Operation of a Switching Power-Supply Unit 10

As illustrated in FIGS. 1 and 2, a switching power-supply unit 10 includes a power conversion circuit 20, a control circuit 30, a half-bridge capacitor 41, a half-bridge capacitor 42, and a common-mode choke coil 50.

In a schematic configuration, the power conversion circuit 20 is connected, at its input end, to a direct-current power supply 91. The direct-current power supply 91 is a high-voltage power supply, and is, for example, a direct-current power supply from 100 V to 1000 V. The direct-current power supply 91 corresponds to a "first direct-current power supply" in the embodiment of the present disclosure. The positive electrode and the negative electrode of the direct-current power supply 91 are isolated from the ground potential GNDs.

The half-bridge capacitor 41 is connected between the input end of the power conversion circuit 20 and the direct-current power supply 91. A midway point of the half-bridge capacitor 41 is connected to a midway point of the half-bridge capacitor 42.

The power conversion circuit 20 is connected, at its output end, to a load 99.

The control circuit 30 is connected, at its input end, to a direct-current power supply 92. The direct-current power supply 92 has a voltage lower than that of the direct-current power supply 91, and is, for example, a direct-current power supply from 12 V to 14 V. The negative electrode of the direct-current power supply 92 is connected to the ground potential GNDs. The ground potential GNDs is different from the potential obtained through grounding to the earth, and is the reference potential, for example, of an electrically driven vehicle including the switching power-supply unit 10. The ground potential GNDs is, for example, the same as that of the chassis of the electrically driven vehicle. The direct-current power supply 92 corresponds to a "second direct-current power supply" in the embodiment of the present disclosure.

The half-bridge capacitor 42 and the common-mode choke coil 50 are connected between the input end of the control circuit 30 and the direct-current power supply 92. More specifically, the common-mode choke coil 50 and the half-bridge capacitor 42 are connected in this sequence from the direct-current power supply 92 side to the control circuit 30.

The control circuit 30 is connected to the power conversion circuit 20. Here, the control circuit 30 has a direct electrical connection to the power conversion circuit 20. "A direct electrical connection" means that the control circuit 30 is connected to the power conversion circuit 20 without other electric circuit devices connected in between.

The control circuit 30 is supplied with power from the direct-current power supply 92. The control circuit 30 generates drive signals for power-conversion switching devices Q1 and Q2, which are used for power conversion, of the power conversion circuit 20, and outputs the generated signals to the power-conversion switching devices Q1 and Q2.

The power conversion circuit 20 exerts control so that the power-conversion switching devices Q1 and Q2 are switched on/off by using the drive signals from the control circuit 30. Thus, the power conversion circuit 20 converts the input voltage, which is supplied from the direct-current power supply 91, to an output voltage for the load 99, and outputs the resulting voltage to the load 99.

The switching operation of the power-conversion switching devices Q1 and Q2 causes common-mode noise in accordance with the switching frequency for power conversion to be generated. In addition, a switching operation of a switching device (for example switching devices Q31 and Q32 of isolated converters 312 and 322 described below) of the control circuit 30 causes common-mode noise in accordance with the switching frequency for the control circuit (for step-down control) to be generated.

As described above, in the switching power-supply unit 10, the half-bridge capacitor 41 is connected to the input end of the power conversion circuit 20. In addition, the half-bridge capacitor 42 is connected to the input end of the control circuit 30. Further, the midway point of the half-bridge capacitor 41 is connected to the midway point of the half-bridge capacitor 42. Furthermore, the common-mode choke coil 50 is connected to the half-bridge capacitor 42 on its direct-current power supply 92 side.

Thus, the power conversion circuit 20, the control circuit 30, the half-bridge capacitor 41, the half-bridge capacitor 42, and the common-mode choke coil 50 form a closed circuit (noise balancing circuit) for common-mode noises (the common-mode noise generated by the power conversion circuit 20, and the common-mode noise generated by the control circuit 30).

Therefore, the common-mode noise currents, which are generated by the power-conversion switching devices Q1 and Q2 of the power conversion circuit 20, and the common-mode noise currents, which are generated in the control circuit 30, do not leak to the direct-current power supply 91 side and the direct-current power supply 92 side of the switching power-supply unit 10, and are confined in the noise balancing circuit. The common-mode noise currents confined in the noise balancing circuit have different phases, and are thus canceled out.

As a result, the switching power-supply unit 10 achieves a reduction of occurrence of common-mode noise currents in the power conversion circuit 20 and the control circuit 30. The common-mode choke coil 50 is connected to the input end of the control circuit 30. That is, the common-mode choke coil 50 is connected, not to wiring lines on the high power side, but to wiring lines on the low power side. Therefore, heat generation and power loss of the common-mode choke coil 50 may be suppressed. Further, the withstand voltage of the common-mode choke coil 50 may be decreased, achieving a small-size and inexpensive common-mode choke coil 50. This achieves a small-size and inexpensive switching power-supply unit 10. The common-mode choke coil 50 is not necessarily included. However, the common-mode choke coil 50 is preferably included. The common-mode choke coil 50 may more reliably suppress occurrence of common-mode noise and a leak of noise currents to the outside.

Exemplary Specific Circuit Configuration of the Switching Power-Supply Unit 10

As illustrated in FIG. 2, the power conversion circuit 20 includes an input capacitor C11, an inductor L1, the power-conversion switching devices Q1 and Q2, and an output capacitor C12. The input capacitor C11 corresponds to a "first input capacitor" in the embodiment of the present disclosure. The output capacitor C12 corresponds to a "first output capacitor" in the embodiment of the present disclosure.

The input capacitor C11 is connected, at its first terminal, to the positive electrode of the direct-current power supply 91. The input capacitor C11 is connected, at its second terminal, to the negative electrode of the direct-current power supply 91. The inductor L1 is connected, at its first terminal, to the positive electrode of the direct-current power supply 91. The inductor L1 is connected, at its second terminal, to a node between the drain of the power-conversion switching device Q1 and the source of the power-conversion switching device Q2.

The source of the power-conversion switching device Q1 is connected to the negative electrode of the direct-current power supply 91 and a negative-side output terminal of the switching power-supply unit 10. The drain of the power-conversion switching device Q2 is connected to a positive-side output terminal of the switching power-supply unit 10. The output capacitor C12 is connected between the positive-side output terminal and the negative-side output terminal of the switching power-supply unit 10. The load 99 is connected between the positive-side output terminal and the negative-side output terminal.

The gate of the power-conversion switching device Q1 and the gate of the power-conversion switching device Q2 are connected to a gate driver integrated circuit (IC) 311 and a gate driver IC 321 of the control circuit 30. More specifically, the gate of the power-conversion switching device Q1 has a direct electrical connection to the gate driver IC 321. The gate of the power-conversion switching device Q2 has a direct electrical connection to the gate driver IC 311.

The control circuit 30 includes the gate driver IC 311, an isolated converter 312, the gate driver IC 321, and an isolated converter 322. Each of the gate driver IC 311 and the gate driver IC 321 corresponds to a "switching drive circuit" in the embodiment of the present disclosure.

The isolated converter 312 is connected, at its input terminal, to the common-mode choke coil 50. The isolated converter 312 is connected, at its output terminal, to the gate driver IC 311. The isolated converter 322 is connected, at its input terminal, to the common-mode choke coil 50. The isolated converter 322 is connected, at its output terminal, to the gate driver IC 321.

The isolated converter 312 includes a capacitor C311, a capacitor C312, the switching device Q31, an insulating transformer TR31, and a rectifier device D31. The isolated converter 312 converts the direct-current voltage of the direct-current power supply 92 to the direct-current drive voltage for the gate driver IC 311, and provides the resulting voltage to the gate driver IC 311. The capacitor C311 corresponds to a "second input capacitor" in the embodiment of the present disclosure.

The isolated converter 322 includes a capacitor C321, a capacitor C322, the switching device Q32, an insulating transformer TR32, and a rectifier device D32. The isolated converter 322 is connected between the common-mode choke coil 50 and the gate driver IC 321. The isolated converter 322 converts the direct-current voltage of the direct-current power supply 92 to the direct-current drive voltage for the gate driver IC 321, and provides the resulting voltage to the gate driver IC 321. The capacitor C321 corresponds to a "second input capacitor" in the embodiment of the present disclosure.

The half-bridge capacitor 41 includes a capacitor C411 and a capacitor C412. The capacitor C411 is connected to the capacitor C412 in series. The series circuit of the capacitor C411 and the capacitor C412 is connected between a positive-side wiring line, for power conversion, which is connected to the positive electrode of the direct-current power supply 91, and a negative-side wiring line, for power conversion, which is connected to the negative electrode of the direct-current power supply 91.

The half-bridge capacitor 42 includes a capacitor C421 and a capacitor C422. The capacitor C421 is connected to the capacitor C422 in series. The series circuit of the capacitor C421 and the capacitor C422 is connected between a positive-side wiring line, for the control circuit, which is connected to the positive electrode of the direct-current power supply 92, and a negative-side wiring line, for the control circuit, which is connected to the negative electrode of the direct-current power supply 92.

The common-mode choke coil 50 is connected between the direct-current power supply 92 and the half-bridge capacitor 42.

The switching power-supply unit 10 having such a configuration schematically operates as follows. The gate driver IC 311 is driven by using power supplied from the direct-current power supply 92 through the common-mode choke coil 50, the half-bridge capacitor 42, and the isolated converter 312, and generates a drive signal for the power-conversion switching device Q2. The gate driver IC 321 is driven by using power supplied from the direct-current power supply 92 through the common-mode choke coil 50, the half-bridge capacitor 42, and the isolated converter 322, and generates a drive signal for the power-conversion switching device Q1 The gate driver IC 311 is synchronized with the gate driver IC 321. The gate driver IC 311 and the gate driver IC 321 are set so that the ON period of the drive signal, which is output by the gate driver IC 311, does not overlap that of the drive signal, which is output by the gate driver IC 321, and the ON voltage of the gate driver IC 311 and that of the gate driver IC 321 are output alternately.

The switching of the power-conversion switching device Q1 of the power conversion circuit 20 is controlled by the drive signal from the gate driver IC 321. The switching of the power-conversion switching device Q2 is controlled by the drive signal from the gate driver IC 311. Thus, the power conversion circuit 20 converts the direct-current voltage of the direct-current power supply 91 to the output voltage for the load 99, and supplies the resulting voltage to the load 99.

In such a configuration, the switching operation of the power-conversion switching device Q1 and the power-conversion switching device Q2 and the switching operation of the switching devices Q31 and Q32 of the isolated converters 312 and 322 in the control circuit 30 are main causes of occurrence of common-mode noise.

However, the switching power-supply unit 10, which has the configuration described above, may reduce occurrence of common-mode noise.

Figure 3:
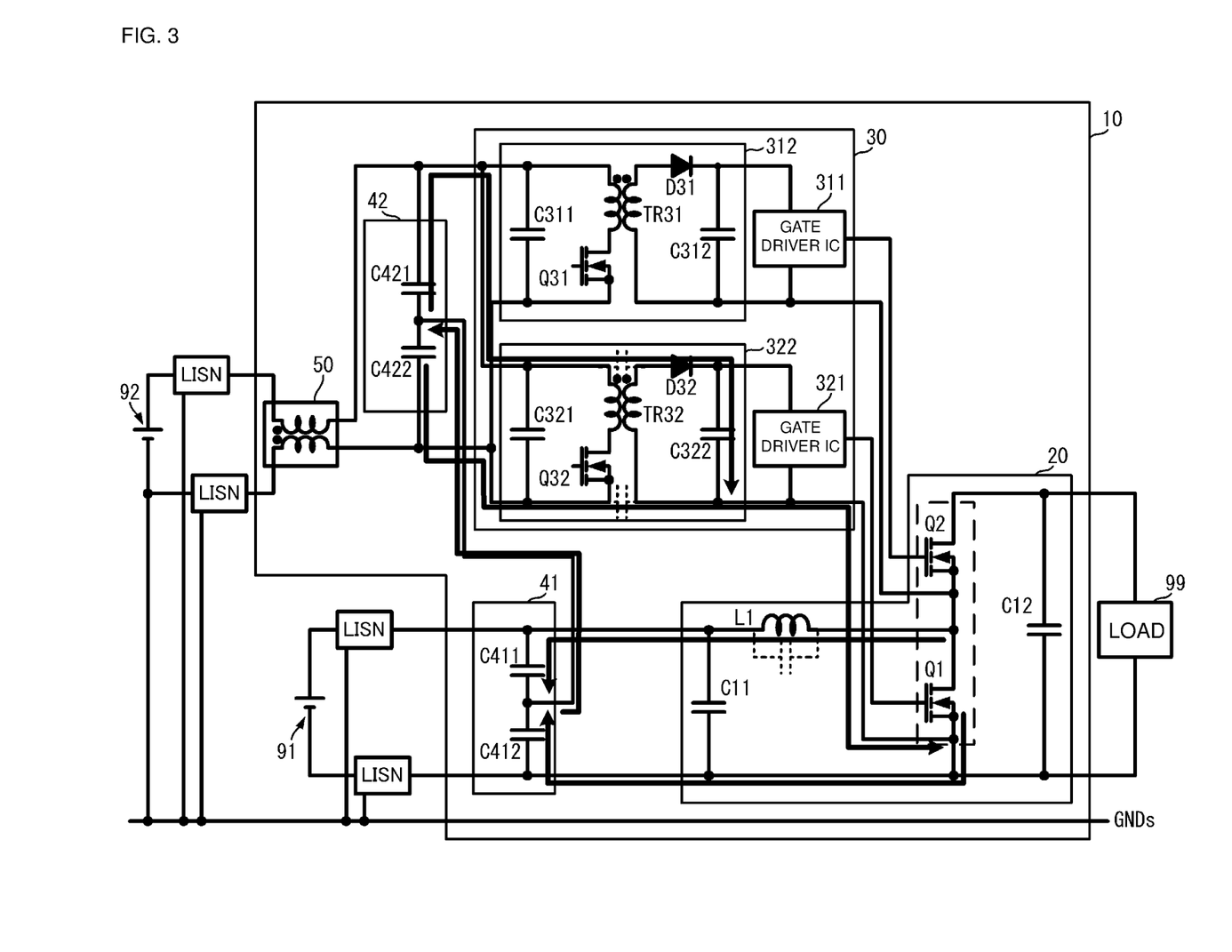
FIG. 3 is a schematic diagram illustrating flows of common-mode currents, which are caused by a power-conversion switching device, in the configuration of the disclosure of the subject application.
Figure 4:
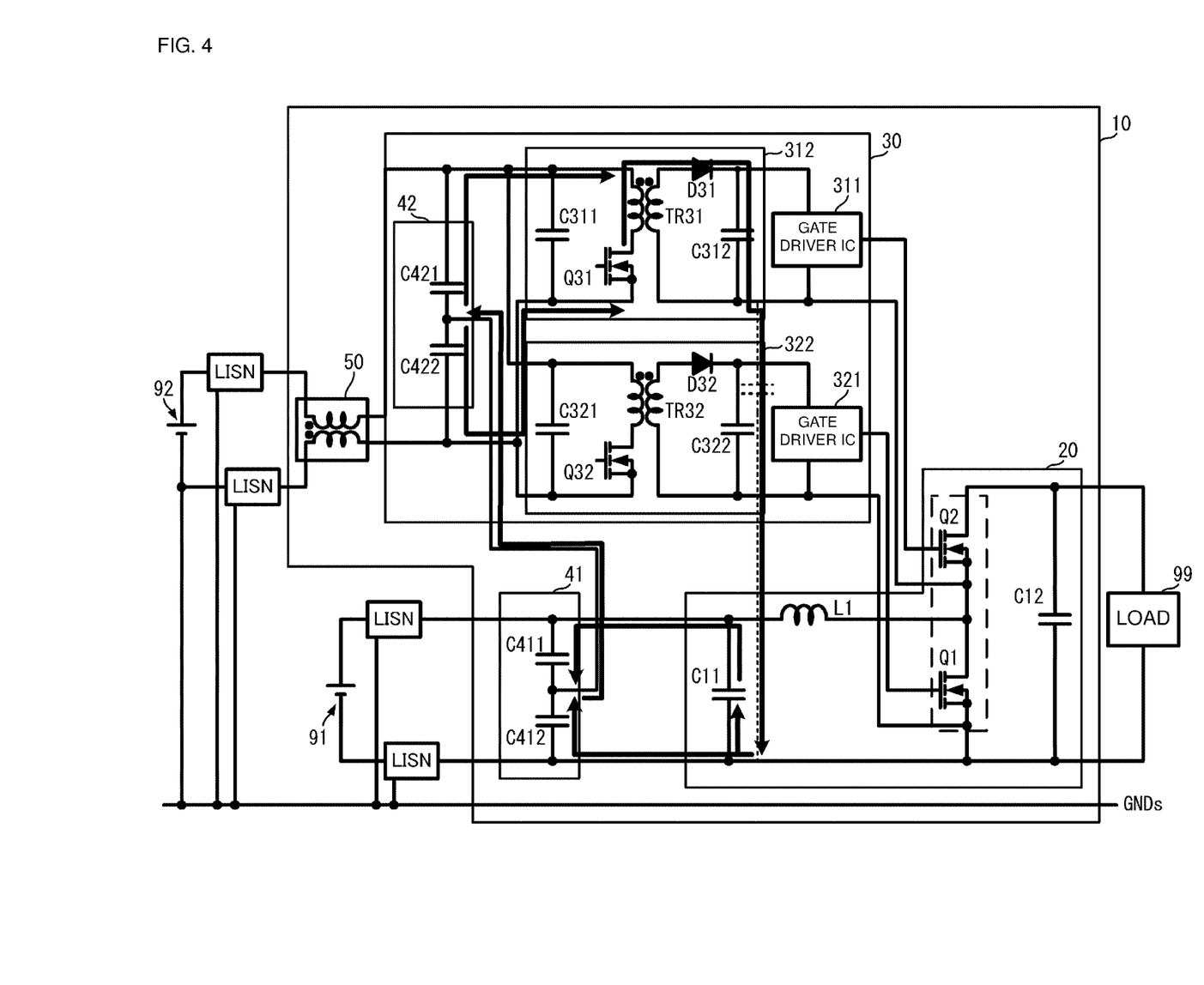
FIG. 4 is a schematic diagram illustrating flows of common-mode currents, which are caused by a switching device in a control circuit, in the configuration of the disclosure of the subject application.

FIG. 3 is a schematic diagram illustrating flows of common-mode currents, which occur due to the power-conversion switching devices, in the configuration of the disclosure of the subject application. FIG. 4 is a schematic diagram illustrating flows of common-mode currents, which occur due to a switching device of the control circuit, in the configuration of the disclosure of the subject application. In FIGS. 3 and 4, bold arrows indicate flows of common-mode currents. Adoption of the configuration of the disclosure of the subject application consequently suppresses the illustrated common-mode currents. However, to make the description easy to understand, FIGS. 3 and 4 illustrate the flows of common-mode currents.

The common-mode currents occur at the power-conversion switching devices Q1 and Q2 and the switching devices Q31 and Q32 which serve as noise sources, and flow through lines which are electrically connected to each other directly or indirectly in the frequency band of the corresponding common-mode noise. Therefore, the common-mode currents flow, not only through the power conversion circuit 20, but also through the control circuit 30.

As illustrated in FIG. 3, in the configuration of the subject application, the half-bridge capacitor 41 is connected to the power conversion circuit 20 on its input side; the half-bridge capacitor 42 is connected to the control circuit 30 on its input side; the midway point of the half-bridge capacitor 41 is connected to the midway point of the half-bridge capacitor 42. Thus, common-mode currents caused by the power-conversion switching devices Q1 and Q2 flow back to the power-conversion switching devices Q1 and Q2, which serve as a noise source, due to the power conversion circuit 20, the half-bridge capacitors 41 and 42, and the control circuit 30. At that time, the common-mode currents have different phases, and are thus canceled out. Therefore, occurrence of common-mode noise is reduced.

As illustrated in FIG. 4, common-mode currents caused by the switching device Q31 and Q32 flow back to the switching devices Q31 and Q32, which are noise sources, due to the control circuit 30, the power conversion circuit 20, and the half-bridge capacitors 41 and 42. At that time, the common-mode currents have different phases, and are thus canceled out. Therefore, occurrence of common-mode noise is reduced.

In addition, in the configuration of the subject application, the common-mode choke coil 50 is connected to the control circuit 30 on its direct-current power supply 92 side. Thus, the common-mode noise currents do not leak from the switching power-supply unit 10 to the direct-current power supply 92 side, that is, to the outside of the switching power-supply unit 10.

In contrast, in a configuration in which the half-bridge capacitors 41 and 42 and the common-mode choke coil 50, as in the configuration of the subject application, are not included, the common-mode noise currents leak from the switching power-supply unit 10 to the outside (for example, the chassis (ground potential GNDs) of an electrically driven vehicle including the switching power-supply unit 10).

Thus, with use of the configuration of the subject application, the switching power-supply unit 10 uses the power conversion circuit 20, the control circuit 30, the half-bridge capacitor 41, the half-bridge capacitor 42, and the common-mode choke coil 50 to implement a closed circuit for the common-mode currents, enabling the noise to be balanced. That is, the switching power-supply unit 10 may include a noise balancing circuit formed of the power conversion circuit 20, the control circuit 30, the half-bridge capacitor 41, the half-bridge capacitor 42, and the common-mode choke coil 50.

Thus, common-mode noise, which is caused by the power-conversion switching devices Q1 and Q2 of the power conversion circuit 20, is confined in the noise balancing circuit, suppressing leaks of the common-mode noise to the outside (for example, the ground potential GNDs) of the switching power-supply unit 10. Further, the confined common-mode noise has different phases, and is thus canceled out.

Similarly, common-mode noise, which is caused by the switching devices Q31 and Q32 of the control circuit 30, is confined in the noise balancing circuit, suppressing leaks of the common-mode noise to the outside (for example, the ground potential GNDs) of the switching power-supply unit 10. Further, the confined common-mode noise has different phases, and is thus canceled out.

The state in which the noise balancing circuit causes common-mode currents to be confined and canceled out may be confirmed through connection of line impedance stabilization networks (LISNs) to the wiring lines on High side and the wiring lines on Low side of the noise balancing circuit (for example, see FIGS. 3 and 4).

Figure 5:
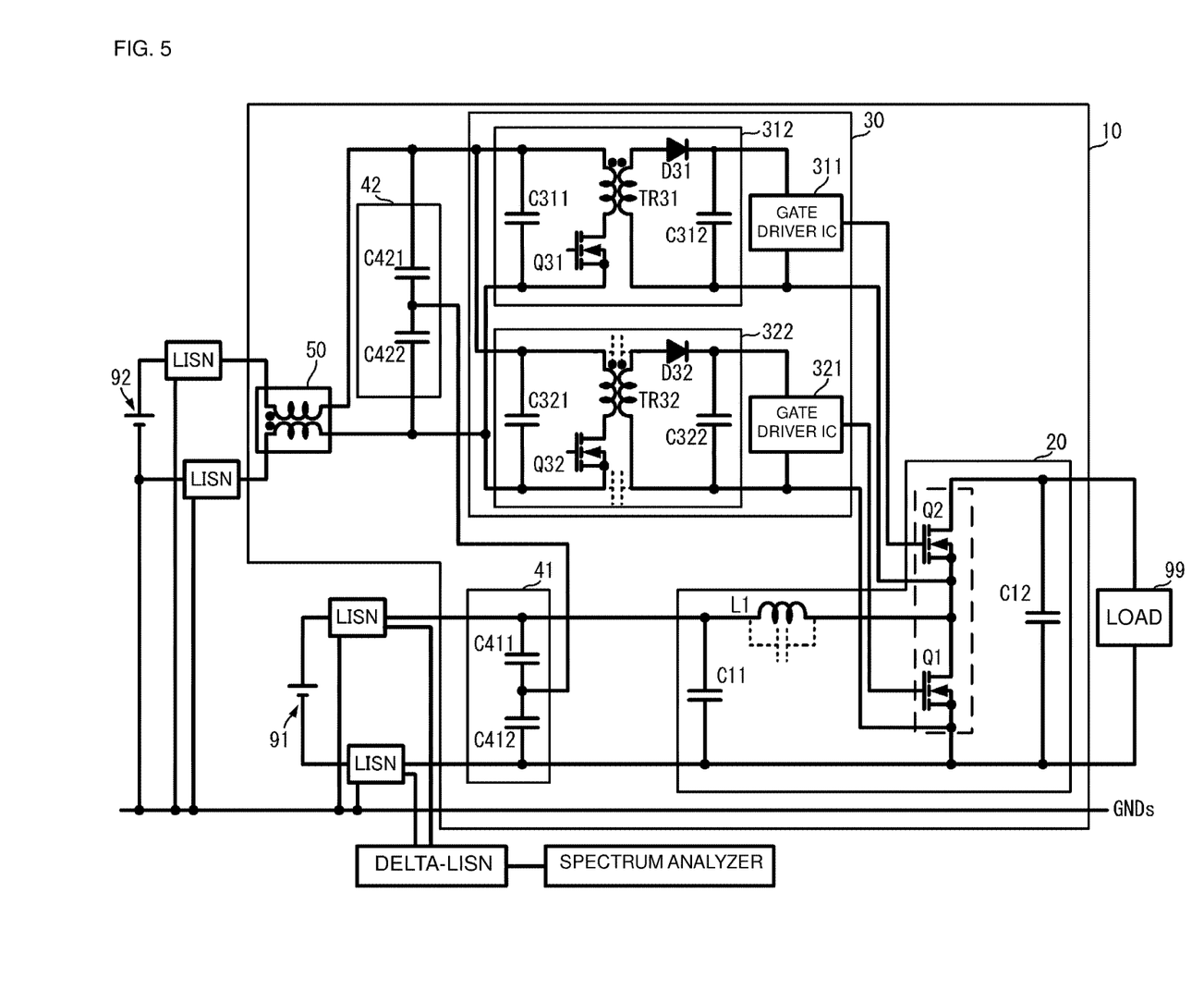
FIG. 5 is a diagram illustrating a circuit example in measurement of common-mode noise using a Delta-LISN.
Figure 6:
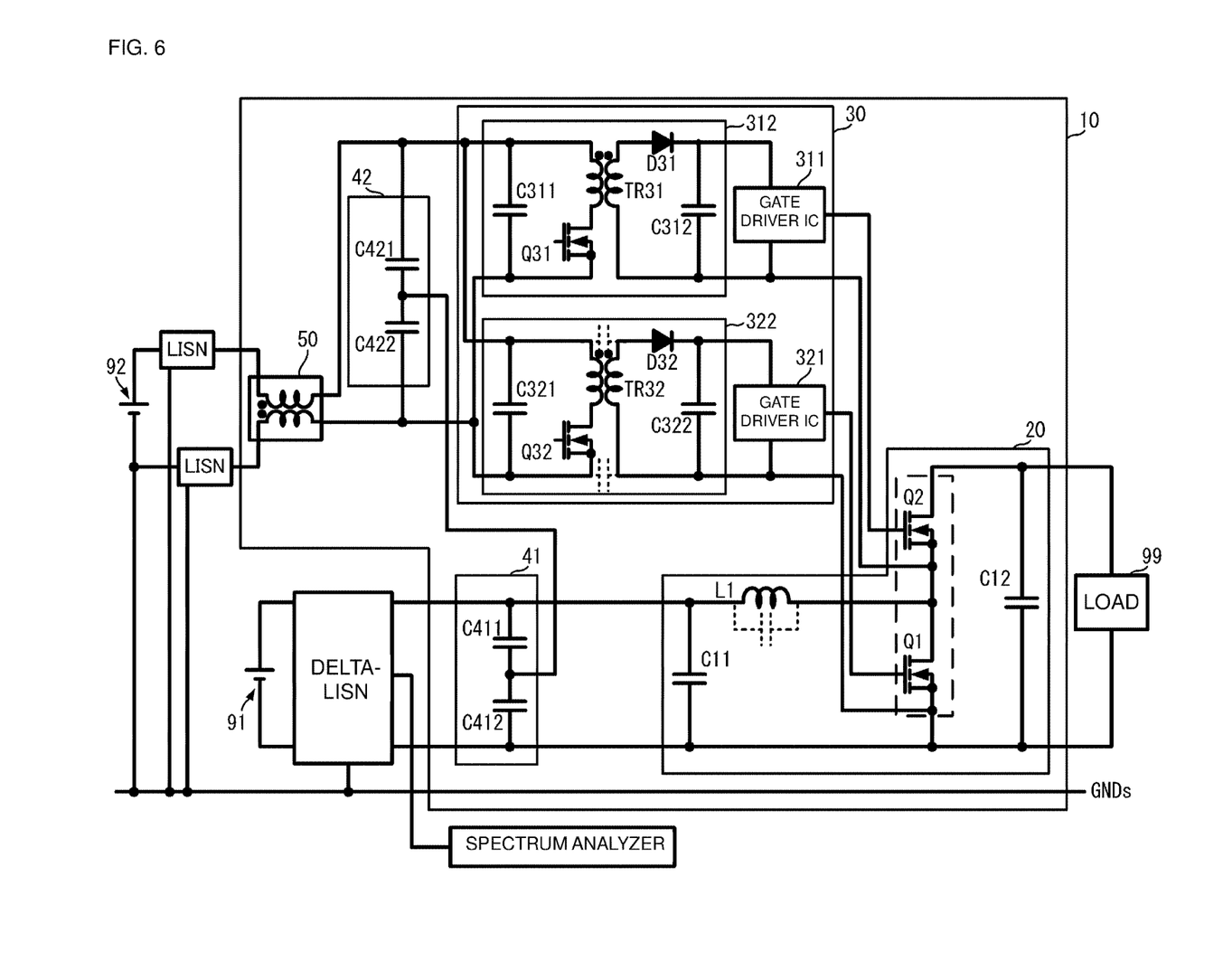
FIG. 6 is a diagram illustrating a circuit example in measurement of common-mode noise using a Delta-LISN.

For example, a Delta-LISN is used to measure the voltage of common-mode noise (common-mode noise voltage). FIGS. 5 and 6 are diagrams illustrating circuit examples in measurement of common-mode noise by using a Delta-LISN. In FIG. 5, a Delta-LISN is connected to LISNs, and is connected to a spectrum analyzer. In FIG. 6, a Delta-LISN is connected between the direct-current power supply 91 and a half-bridge capacitor 41, and is connected to a spectrum analyzer. If the common-mode noise voltage, which is measured in these measurement configurations (measurement methods), is substantially zero or sufficiently small, the state in which the noise balancing circuit causes common-mode currents to be confined and canceled out may be detected.

Figure 7:
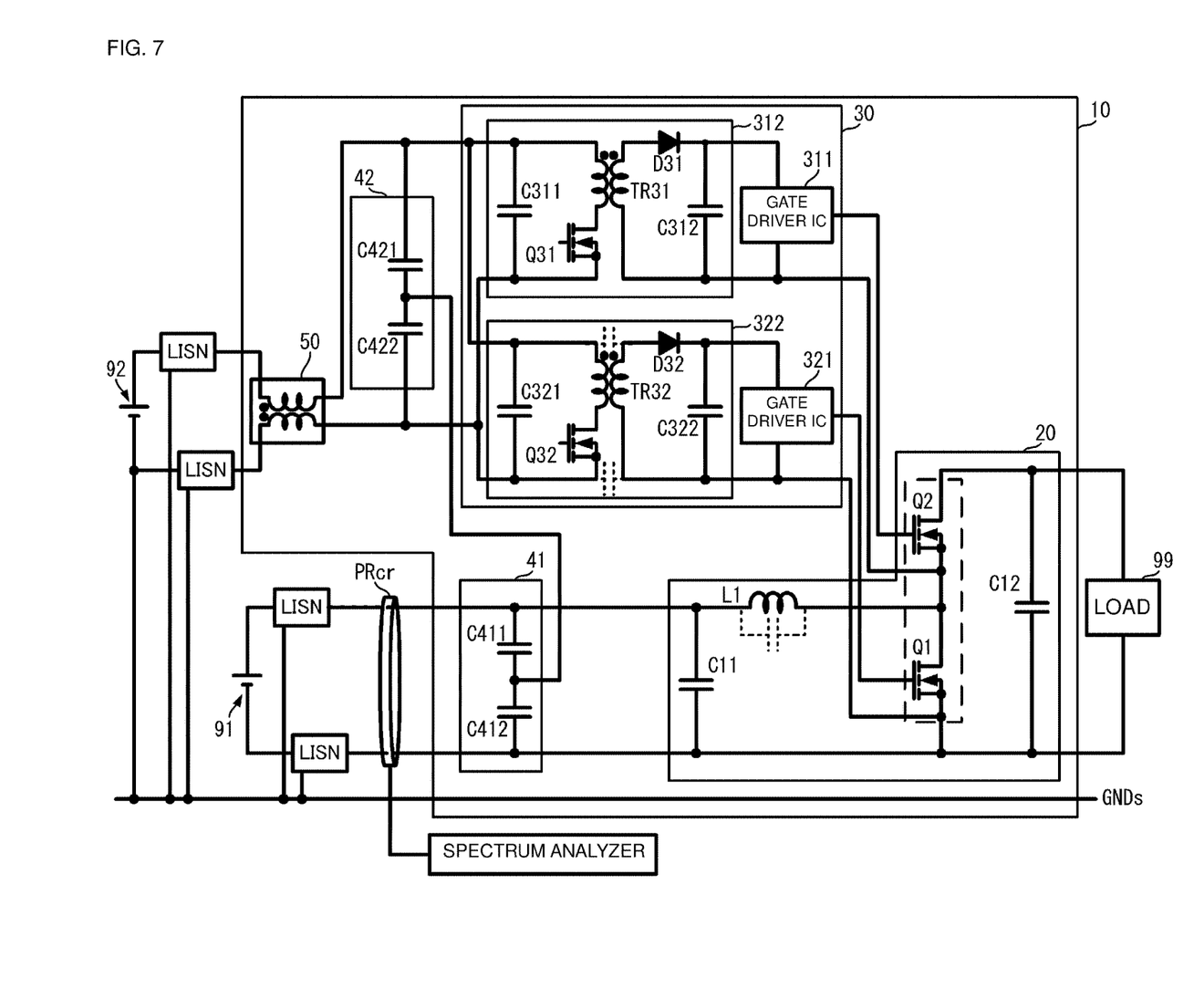
FIG. 7 is a circuit diagram illustrating the case in which a current probe PRcr is disposed around a cable on High side and a cable on Low side.
Figure 8:
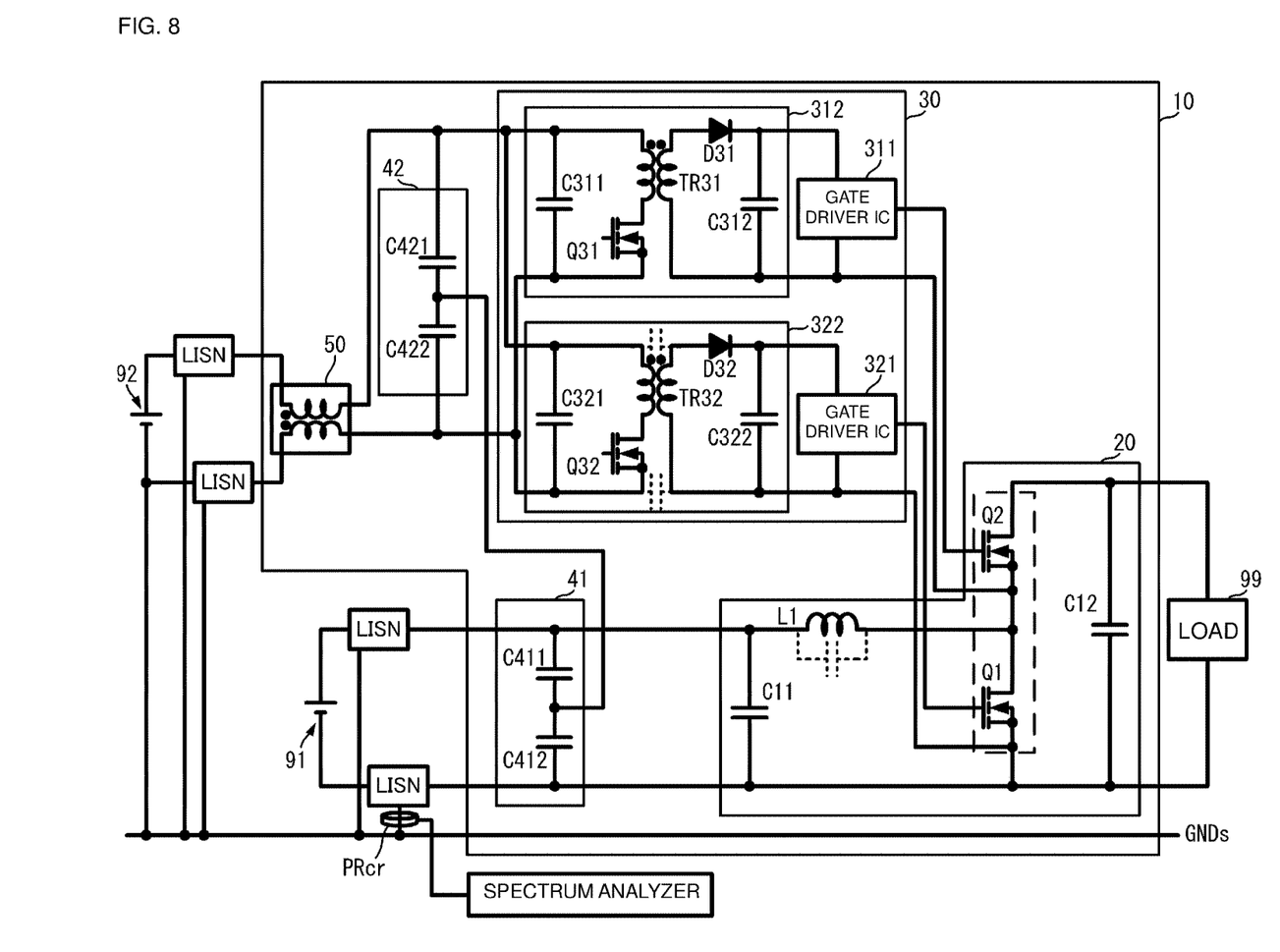
FIG. 8 is a circuit diagram illustrating the case in which a current probe PRcr is disposed around a cable connecting a LISN to a chassis.

Alternatively, a current probe is disposed around a cable on High side and a cable on Low side or a cable connecting a LISN to the chassis. The probe is used to measure the common-mode current. FIG. 7 is a circuit diagram illustrating the case in which a current probe PRcr is disposed around a cable on High side and a cable on Low side. FIG. 8 is a circuit diagram illustrating the case in which a current probe PRcr is disposed around a cable connecting a LISN to the chassis. In each configuration in FIGS. 7 and 8, the current probe PRcr is connected to a spectrum analyzer. If the common-mode current is substantially zero or sufficiently small in these measurement configurations (measurement methods), the state in which the noise balancing circuit causes common-mode currents to be confined and canceled out may be detected.

Therefore, the switching power-supply unit 10 may reduce occurrence of common-mode noise from the power conversion circuit 20 and the control circuit 30, and achieves suppression of electromagnetic interference (EMI) noise and power integrity (ensuring the quality of a power supply).

That is, the switching power-supply unit 10 does not need connection of the common-mode choke coil to a wiring line connected to the power conversion circuit through which a large current flows. In addition, the switching power-supply unit 10 may cancel out occurrence of noise at the noise source, and may suppress heat generation and power loss of the common-mode choke coil and reduce occurrence of common-mode noise currents from the power conversion circuit and the control circuit. In particular, a switching power-supply unit, such as one in an electric vehicle, which is difficult to be grounded by using the earth as the ground potential due to traveling, may effectively reduce occurrence of common-mode noise currents while suppressing heat generation and power loss of a common-mode choke coil.

Figure 9:
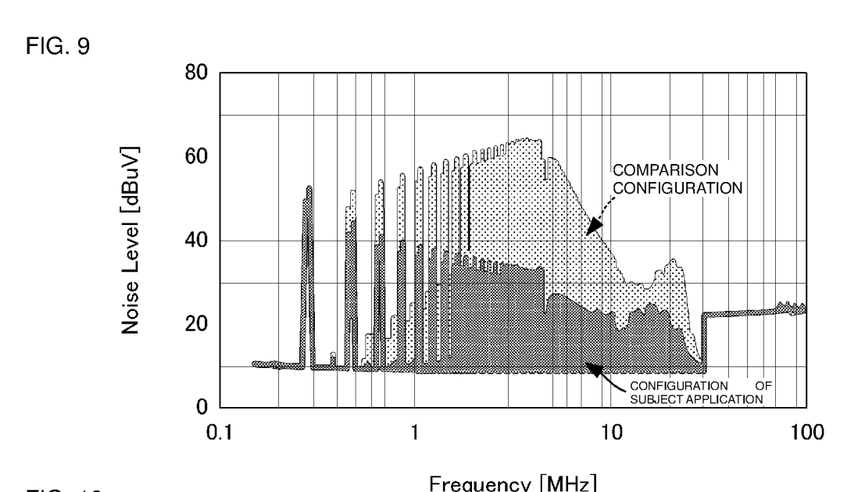
FIG. 9 is a graph illustrating the noise level in the configuration of the subject application and that in a comparison configuration.

FIG. 9 is a graph illustrating the noise level in the configuration of the subject application and that in a comparison configuration. As illustrated in FIG. 9, adoption of the disclosure of the subject application achieves suppression of noise in a band from 2 MHz to 20 MHz. In particular, noise in a 5-MHz band may be effectively suppressed.

In the switching power-supply unit 10, the common-mode choke coil 50 is not connected to wiring lines for power conversion, and is connected to wiring lines for control at a low power. This may suppress heat generation of the common-mode choke coil 50. Therefore, the switching power-supply unit 10 may reduce occurrence of common-mode noise while suppressing heat generation and power loss.

Further, the withstand voltage of the common-mode choke coil 50 does not need to be made high, resulting in a reduction in size. Therefore, the switching power-supply unit 10 may reduce occurrence of common-mode noise while achieving a reduction in size.

In particular, the switching power-supply unit 10 is more effective when included in an electrically driven vehicle. Specifically, common-mode noise, which occurs due to the switching operation of the power conversion circuit 20, may be conducted through the chassis (a component having the same potential as the ground potential GNDs), causing a problem of electromagnetic interference with another electronic circuit of the vehicle. For example, common-mode noise, which enters a control circuit of another electronic circuit of the vehicle, leads to a problem of a malfunction in a control operation on a switching device of the control circuit. In addition, if common-mode noise reaches another device, a problem of a malfunction occurs in the other device. Emission of common-mode noise from the chassis causes a problem of a malfunction of an electronic device outside the vehicle.

However, the configuration of the switching power-supply unit 10 achieves suppression of leaks of common-mode noise currents from the switching power-supply unit 10 to the outside, and achieves suppression of occurrence of problems as described above. In particular, in an electrically driven vehicle, the power conversion circuit 20 receives a very high current and voltage. Therefore, the configuration of the switching power-supply unit 10 of the present disclosure is more effective.

In the switching power-supply unit 10, the negative electrode of the direct-current power supply 92 is connected to the ground potential GNDs, and the positive electrode and the negative electrode of the direct-current power supply 91 are not connected to the ground potential GNDs. Thus, the switching power-supply unit 10 enables the operation of the control circuit 30 to be stabilized while suppressing an adverse effect on the outside through the direct-current power supply 91 whose voltage and current are high.

In the switching power-supply unit 10, the negative electrode of the gate driver IC 311 is connected to the source of the power-conversion switching device Q1, and the negative electrode of the gate driver IC 321 is connected to the source of the power-conversion switching device Q2. Thus, the switching power-supply unit 10 enables stabilized drive signals to be supplied to the power-conversion switching devices Q1 and Q2.

The isolated converters 312 and 322 of the control circuit 30 may be replaced with non-isolated converters. However, inclusion of the isolated converters 312 and 322 achieves more reliable electrical protection of the gate driver ICs 311 and 321 from the direct-current power supply 92 side.

The switching power-supply unit 10 may include another half-bridge capacitor on the output side of the power conversion circuit 20.

The configuration of the control circuit 30 is exemplary. Another configuration may be employed as long as an input capacitor and the gate driver ICs 311 and 321, which are used for a control circuit, are included, and the drive signals described above are output to the power-conversion switching devices Q1 and Q2 of the power conversion circuit 20. In addition, another configuration may be employed as long as the control circuit 30 has a converter circuit, including a switching device, to supply power to the gate driver ICs 311 and 321. In addition, the power conversion circuit 20 may have another configuration as long as the input capacitor C11, the power-conversion switching devices Q1 and Q2, and the output capacitor C12 are included.

In the embodiment described above, the form in which the negative electrode of the direct-current power supply 92 is connected to the ground potential GNDs is described. Alternatively, the positive electrode and the negative electrode of the direct-current power supply 92 may be isolated from the ground potential GNDs.

In the embodiment described above, the control circuit 30 may include a control IC which controls driving the gate driver ICs 311 and 321. The control IC outputs a switching control signal to the gate driver ICs 311 and 321 on the basis of the output power of the power conversion circuit 20 so that the output voltage is controlled at a certain level.

Second Embodiment

Figure 10:
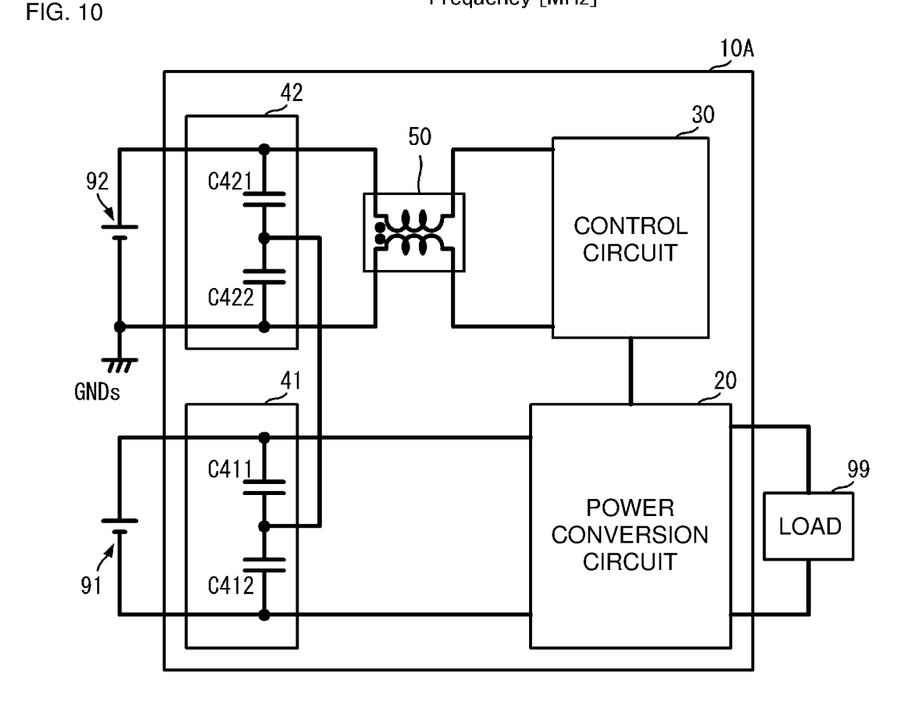
FIG. 10 is a circuit block diagram illustrating an exemplary configuration of a switching power-supply unit according to a second embodiment of the present disclosure.

A switching power-supply unit according to a second embodiment of the present disclosure will be described by referring to a figure. FIG. 10 is a circuit block diagram illustrating an exemplary configuration of a switching power-supply unit according to the second embodiment of the present disclosure.

As illustrated in FIG. 10, a switching power-supply unit 10A according to the second embodiment is different from the switching power-supply unit 10 according to the first embodiment in the connection form of the half-bridge capacitor 42 and the common-mode choke coil 50. The other configuration of the switching power-supply unit 10A is substantially the same as that of the switching power-supply unit 10, and substantially the same points will not be described.

The half-bridge capacitor 42 is connected between the direct-current power supply 92 and the common-mode choke coil 50. The common-mode choke coil 50 is connected between the half-bridge capacitor 42 and the control circuit 30.

Such a configuration enables the switching power-supply unit 10A to, like the switching power-supply unit 10, achieve a reduction of occurrence of common-mode noise from the power conversion circuit 20 and the control circuit 30.

Third Embodiment

Figure 11:
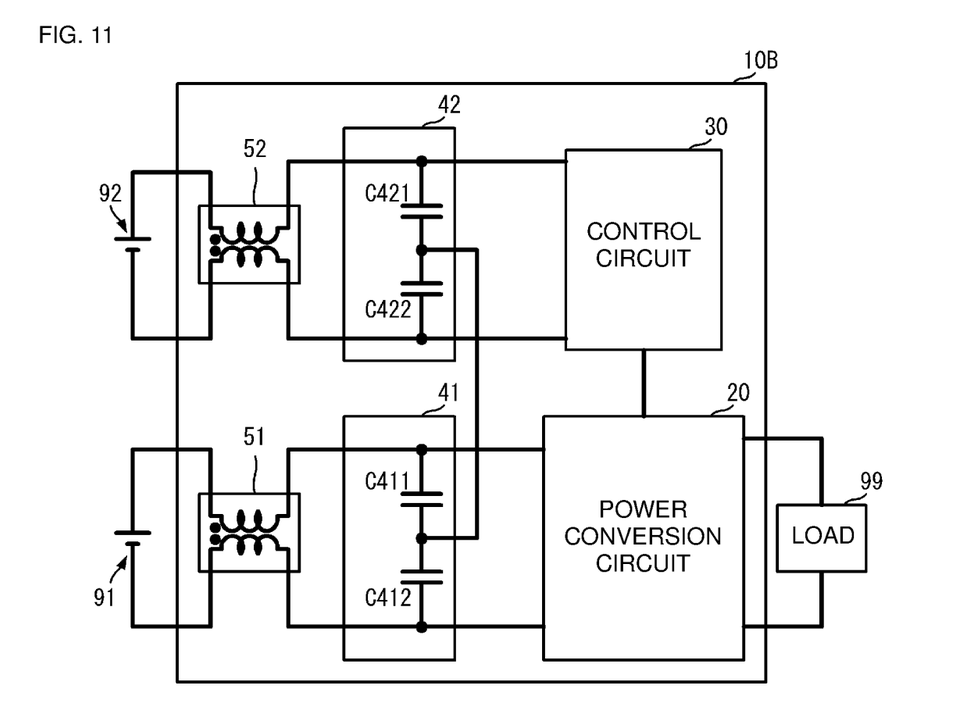
FIG. 11 is a circuit block diagram illustrating an exemplary configuration of a switching power-supply unit according to a third embodiment of the present disclosure.

A switching power-supply unit according to a third embodiment of the present disclosure will be described by referring to a figure. FIG. 11 is a circuit block diagram illustrating an exemplary configuration of the switching power-supply unit according to the third embodiment of the present disclosure.

As illustrated in FIG. 11, a switching power-supply unit 10B according to the third embodiment is different from the switching power-supply unit 10 according to the first embodiment in that common-mode choke coils 51 and 52 are included. The other configuration of the switching power-supply unit 10B is substantially the same as that of the switching power-supply unit 10, and substantially the same points will not be described.

In the switching power-supply unit 10B, the common-mode choke coil 51 is connected to the input end of the power conversion circuit 20. The common-mode choke coil 51 is connected between the direct-current power supply 91 and the half-bridge capacitor 41.

In the switching power-supply unit 10B, the common-mode choke coil 52 is connected to the input end of the control circuit 30. The common-mode choke coil 52 is connected between the direct-current power supply 92 and the half-bridge capacitor 42.

Like the common-mode choke coil 50 described in the embodiments described above, the common-mode choke coil 52 has a high impedance. The common-mode choke coil 51 has an impedance lower than that of the common-mode choke coil 52.

Such a configuration enables the switching power-supply unit 10B to achieve a further reduction of occurrence of common-mode noise from the power conversion circuit 20 and the control circuit 30. In addition, the common-mode choke coil 51, whose impedance is lower than that of the common-mode choke coil 52, achieves suppression of power loss of high-power circuits on the power conversion side.

Fourth Embodiment

Figure 12:
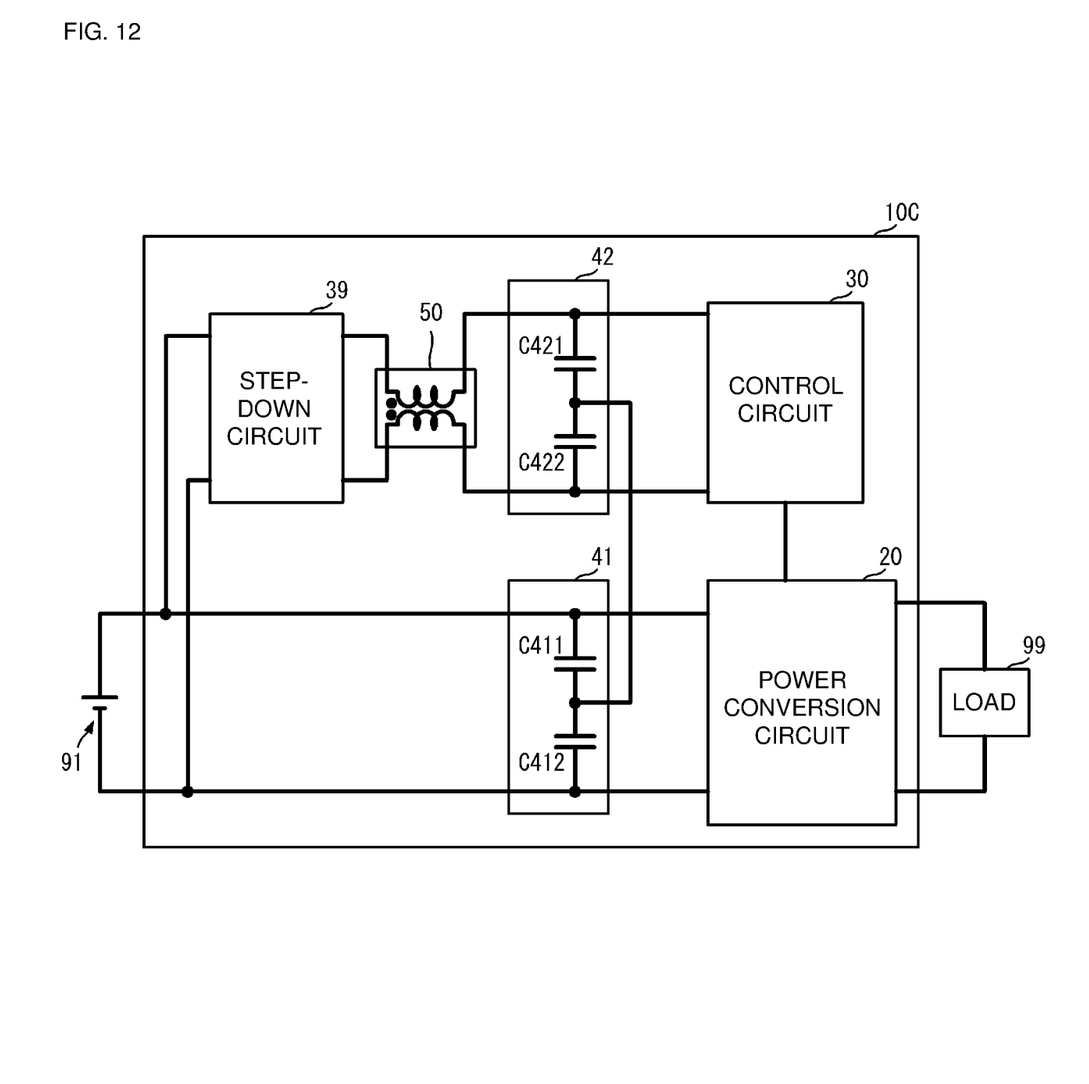
FIG. 12 is a circuit block diagram illustrating an exemplary configuration of a switching power-supply unit according to a fourth embodiment of the present disclosure.

A switching power-supply unit according to a fourth embodiment of the present disclosure will be described by referring to a figure. FIG. 12 is a circuit block diagram illustrating an exemplary circuit configuration of the switching power-supply unit according to the fourth embodiment of the present disclosure.

As illustrated in FIG. 12, a switching power-supply unit 10C according to the fourth embodiment is different from the switching power-supply unit 10 according to the first embodiment in that direct-current power is supplied from the single direct-current power supply 91. The other configuration of the switching power-supply unit 10C is substantially the same as that of the switching power-supply unit 10, and substantially the same points will not be described.

The switching power-supply unit 10C is connected to the direct-current power supply 91. A step-down circuit 39 is connected between the common-mode choke coil 50 and the direct-current power supply 91. The step-down circuit 39 is, for example, a step-down DC/DC converter.

This configuration enables the switching power-supply unit 10C to, like the switching power-supply unit 10, reduce occurrence of common-mode noise from the power conversion circuit 20 and the control circuit 30. The configuration of the switching power-supply unit 10C does not need multiple direct-current power supplies having different voltages, and may use a single direct-current power supply to reduce occurrence of common-mode noise from the power conversion circuit 20 and the control circuit 30 while suppressing heat generation and power loss.

The configurations of the embodiments described above may be combined with each other appropriately, enabling operation and effect in accordance with each combination to be exerted.

(1) A switching power-supply unit comprising a power conversion circuit that includes a first input capacitor, at least one power-conversion switching device for power conversion, and a first output capacitor, and that converts, for output to a load, power supplied from a first direct-current power supply; and a control circuit that includes a second input capacitor and at least one switching drive circuit, and that generates a drive signal for the at least one power-conversion switching device by using power supplied from a second direct-current power supply, the control circuit having a direct electrical connection to the power conversion circuit. The switching power-supply unit further comprises a control-circuit-side common-mode choke coil that is connected to the control circuit on the second direct-current power supply side of the control circuit; a first half-bridge capacitor that is connected to the power conversion circuit on the first direct-current power supply side of the power conversion circuit; and a second half-bridge capacitor that is connected to the control circuit on the second direct-current power supply side of the control circuit. A midway point of the first half-bridge capacitor is electrically connected to a midway point of the second half-bridge capacitor, and a noise balancing circuit is formed of a closed circuit including the power conversion circuit, the control circuit, the first half-bridge capacitor, the second half-bridge capacitor, and the control-circuit-side common-mode choke coil. The noise balancing circuit causes common-mode currents to be confined and canceled out each other, the common-mode currents serving as switching noise generated in a plurality of parts of the closed circuit due to a switching operation of the at least one power-conversion switching device.

(2) The switching power-supply unit according to (1), wherein the control-circuit-side common-mode choke coil is connected between the second direct-current power supply and the second half-bridge capacitor.

(3) The switching power-supply unit according to (1) or (2), wherein the control-circuit-side common-mode choke coil is connected between the second half-bridge capacitor and the control circuit.

(4) The switching power-supply unit according to any one of (1) to (3), wherein the at least one switching drive circuit comprises a plurality of switching drive circuits, and the at least one power-conversion switching device comprises a plurality of power-conversion switching devices, and the control circuit includes an isolated converter and the plurality of switching drive circuits. Also, negative electrodes of the plurality of switching drive circuits are connected to source potentials of the plurality of power-conversion switching devices.

(5) The switching power-supply unit according to any one of (1) to (4), further comprising a power-conversion-circuit-side common-mode choke coil that is connected between the first direct-current power supply and the first half-bridge capacitor.

(6) The switching power-supply unit according to any one of (1) to (5), wherein the first direct-current power supply has a voltage higher than a voltage of the second direct-current power supply.

(7) The switching power-supply unit according to any one of (1) to (6), wherein a negative electrode of the second direct-current power supply is connected to a ground potential.

(8) The switching power-supply unit according to (7), wherein a positive electrode and a negative electrode of the first direct-current power supply are electrically isolated from the ground potential.

(9) The switching power-supply unit according to (7) or (8), wherein the noise balancing circuit, the first direct-current power supply, and the second direct-current power supply are included in a vehicle, and the ground potential is the same as a potential of the vehicle's chassis.

What is claimed is:

1. A switching power-supply unit comprising:
   a power conversion circuit that includes a first input capacitor, at least one power-conversion switching device configured for power conversion, and a first output capacitor, and the power conversion circuit is configured to convert power supplied from a first direct-current power supply; for output to a load;
   a control circuit that includes a second input capacitor and at least one switching drive circuit, the control circuit is configured to generate a drive signal for the at least one power-conversion switching device by using power supplied from a second direct-current power supply, and the control circuit has a direct electrical connection to the power conversion circuit;
   a control-circuit-side common-mode choke coil that is connected to the control circuit on a side of the second direct-current power supply of the control circuit;
   a first half-bridge capacitor that is connected to the power conversion circuit on a side of the first direct-current power supply of the power conversion circuit; and
   a second half-bridge capacitor that is connected to the control circuit on the side of the second direct-current power supply of the control circuit,
   wherein
   a midway point of the first half-bridge capacitor is electrically connected to a midway point of the second half-bridge capacitor, and
   a noise balancing circuit is configured of a closed circuit including the power conversion circuit, the control circuit, the first half-bridge capacitor, the second half-bridge capacitor, and the control-circuit-side common-mode choke coil, and the noise balancing circuit is configured to confine common-mode currents to cancel out each other, the common-mode currents being switching noise generated in a plurality of parts of the closed circuit due to a switching operation of the at least one power-conversion switching device.

2. The switching power-supply unit according to claim 1, wherein
   the control-circuit-side common-mode choke coil is connected between the second direct-current power supply and the second half-bridge capacitor.

3. The switching power-supply unit according to claim 1, wherein
   the control-circuit-side common-mode choke coil is connected between the second half-bridge capacitor and the control circuit.

4. The switching power-supply unit according to claim 1, wherein
   the at least one switching drive circuit comprises a plurality of switching drive circuits, and the at least one power-conversion switching device comprises a plurality of power-conversion switching devices,
   the control circuit includes an isolated converter and the plurality of switching drive circuits, and
   negative electrodes of the plurality of switching drive circuits are connected to source potentials of the plurality of power-conversion switching devices.

5. The switching power-supply unit according to claim 1, further comprising:
   a power-conversion-circuit-side common-mode choke coil that is connected between the first direct-current power supply and the first half-bridge capacitor.

6. The switching power-supply unit according to claim 1, wherein
   the first direct-current power supply has a voltage higher than a voltage of the second direct-current power supply.

7. The switching power-supply unit according to claim 1, wherein
   a negative electrode of the second direct-current power supply is connected to a ground potential.

8. The switching power-supply unit according to claim 7, wherein
   a positive electrode and a negative electrode of the first direct-current power supply are electrically isolated from the ground potential.

9. The switching power-supply unit according to claim 7, wherein
   the noise balancing circuit, the first direct-current power supply, and the second direct-current power supply are included in a vehicle, and
   the ground potential is the same as a potential of a chassis of the vehicle.

10. The switching power-supply unit according to claim 2, wherein
    the control-circuit-side common-mode choke coil is connected between the second half-bridge capacitor and the control circuit.

11. The switching power-supply unit according to claim 2, wherein
    the at least one switching drive circuit comprises a plurality of switching drive circuits, and the at least one power-conversion switching device comprises a plurality of power-conversion switching devices,
    the control circuit includes an isolated converter and the plurality of switching drive circuits, and
    negative electrodes of the plurality of switching drive circuits are connected to source potentials of the plurality of power-conversion switching devices.

12. The switching power-supply unit according to claim 2, further comprising:
    a power-conversion-circuit-side common-mode choke coil that is connected between the first direct-current power supply and the first half-bridge capacitor.

13. The switching power-supply unit according to claim 2, wherein
    the first direct-current power supply has a voltage higher than a voltage of the second direct-current power supply.

14. The switching power-supply unit according to claim 2, wherein
    a negative electrode of the second direct-current power supply is connected to a ground potential.

15. The switching power-supply unit according to claim 14, wherein
    a positive electrode and a negative electrode of the first direct-current power supply are electrically isolated from the ground potential.

16. The switching power-supply unit according to claim 14, wherein
    the noise balancing circuit, the first direct-current power supply, and the second direct-current power supply are included in a vehicle, and the ground potential is the same as a potential of a chassis of the vehicle.

\* \* \* \* \*